T. M. EYNON.
DEEP SEA SOUNDING MECHANISM.
APPLICATION FILED MAY 13, 1910.
1,052,411.
Patented Feb. 4, 1913.
2 SHEETS—SHEET 2.
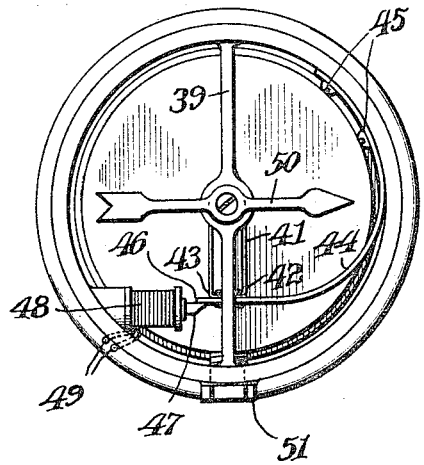
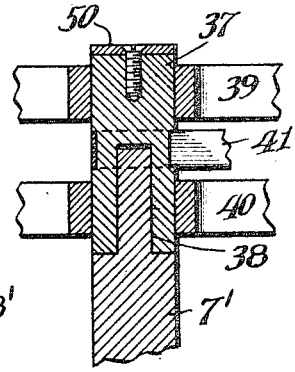
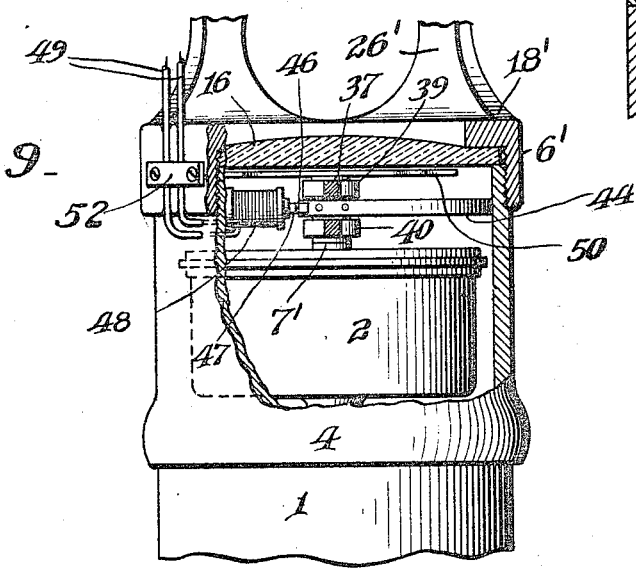
INVENTOR
Thomas M. Eynon
BY William Steell Jackson
ATTORNEY
WITNESSES
C. Pommert
A. Helen Abplanalp

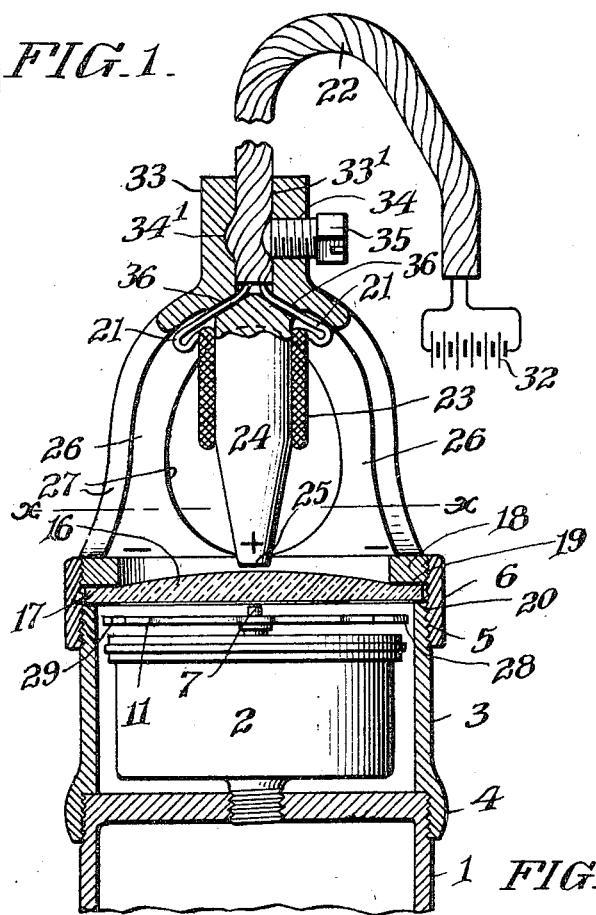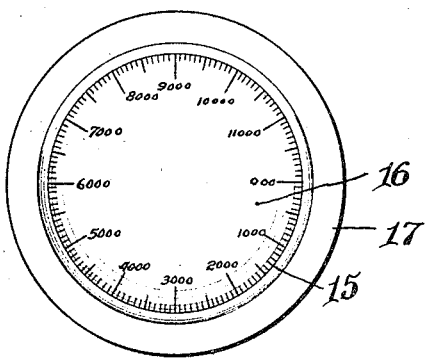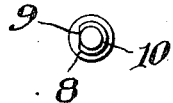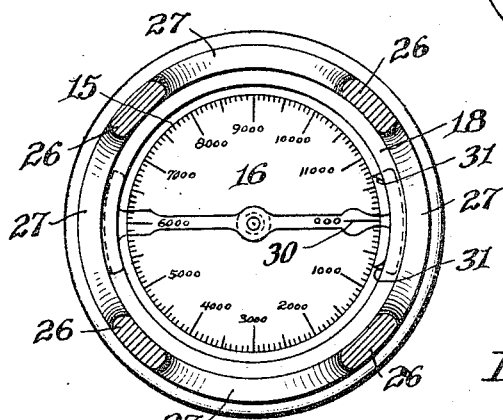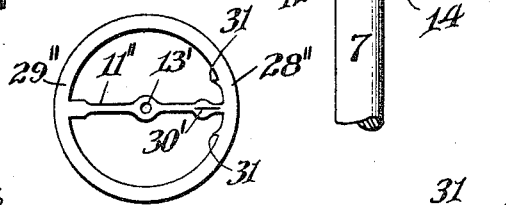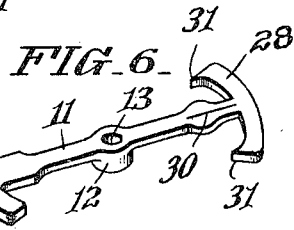

UNITED STATES PATENT OFFICE.

THOMAS M. EYNON, OF PHILADELPHIA, PENNSYLVANIA.

DEEP-SEA-SOUNDING MECHANISM.

1,052,411.  Specification of Letters Patent.  Patented Feb. 4, 1913.

Application filed May 13, 1910.  Serial No. 561,050.

*To all whom it may concern:*

Be it known that I, THOMAS M. EYNON, a citizen of the United States, and a resident of Philadelphia, Pennsylvania, have invented a certain new and useful Deep-Sea-Sounding Mechanism, of which the following is a specification.

The purpose of my invention is to obtain accurate and reliable readings of the depth reached by deep sea sounders.

In the forms at present in use the leakage or regurgitation of the water out through the inlet valve causes a like change in the needle position. I overcome this difficulty by locking the needle in position when the sounder has reached the depth which is to be determined. I provide for this locking by electric means and, in order that my invention may not be misunderstood to apply to either continuous or momentary application of electric current alone, I here illustrate one structure of each type, each of which clearly illustrates the application of my invention with the character of current selected and each of which is at the same time practical, efficient and inexpensive.

In the continuous current form I have preferred to separate the needle wholly from angular connection with its shaft in order that the shaft may turn at will in proportion to the pressure of the water, and I have accomplished this lifting of the needle by an electro-magnet placed in operative proximity to the needle. In the type illustrated which is intended for momentary current action I have preferred to release a spring within the sounder and thus to brake the upper part of a shaft which is in frictional engagement only with the lower part of the same. I recognize that either or any form of release of the needle from angular control by its spindle may be used freely with any means of electrically applying or releasing a controlling force.

Figure 1 is a broken longitudinal section of a structure embodying my invention. Fig. 2 is a section of the structure seen in Fig. 1, taken upon line $x$—$x$ thereof. Fig. 3 is a top plan view of a gage glass and dial used by me. Fig. 4 is a partial section of the spindle and needle used in this form. Fig. 5 is a top plan view of the spindle shown in Fig. 4. Fig. 6 is a perspective view of the form of needle used in Fig. 1. Fig. 7 is a side elevation of another form of needle. Fig. 8 is a top plan view of still another needle. Fig. 9 is an elevation and partial section of another form of my invention. Fig. 10 is a top plan view of a portion of the structure of Fig. 9. Fig. 11 is a vertical section of a portion of the structure seen in Fig. 9.

Like numerals of reference refer to corresponding parts in the drawings.

The gage mechanism may be of any of a number of well known types. By it the pressure of the water causes rotation of a spindle to indicate the depth.

My invention may be applied to existing forms of gage, using their devices for fixing the desired reading as a check on the reading obtained by me.

I have not considered it necessary to illustrate the interior mechanism of the gage itself nor have I shown the valve by which the water is, in many such constructions, trapped within the gage.

In the form shown in Figs. 1–7 (Sheet 1) I illustrate the lower portion 1 of a conventional sounder within which I place a gage 2. This gage is placed within an upper casing 3, screw threaded to the bottom portion at 4 and itself screw threaded exteriorly at 5 to provide for sealing and other functions through collar 6. I show the spindle 7 projecting from the top of the gage and provide this spindle in this form with an irregularity or departure from cylindrical form at 8 which I prefer to make by flatting one side thereof at 9 for a short distance only, continuing the spindle in cylindrical form at 10 of such radius that the flattened portion shall be substantially tangent to the cylindrical surface so formed. Upon this spindle I place a needle 11 having a boss 12 bored at 13 to agree with the upper portion 10 of the spindle and irregularly counterbored at 14 to agree with the irregularity of the portion 8 of the spindle. It will be evident that the needle will move angularly in agreement with the spindle 7 in the position shown in full in Fig. 4 but that, when the needle is moved to the dotted position in Fig. 4, it will be free from angular control by this spindle.

I prefer to provide the scale 15 for this needle upon the under and plane side of a plano-convex lens glass 16 which is made of uniform thickness at the outer edge 17 in order to provide for a convenient seal between the parts. It seals against the section 3 of the sounder upon the one side and a ring 18 which is screwed into collar 6 upon the other side. I cushion the lens seal by any desired gasketing at 19 and 20. Any desired system of dial graduations may be used.

I prefer to paint or otherwise apply the scale or dial directly to the under surface of the plano-convex lens in order that the lens may magnify the reading and that the dial may obscure sight through the glass and into the top of the sounder as little as possible. The lens here forms a convenient form of support for the markings, though, obviously, other forms of support might be provided. I place the top portion 10 of the spindle in close enough proximity to the lens so that my needle may be brought directly in contact with the under surface of the dial at the same time that it is freed from angular control by the spindle. In the illustration selected I lift my needle from the solid line to the dotted line position shown in Fig. 4 by electro-magnetic means, transmitting a current of electricity by means of wires 21 from cable 22 to a coil 23 about a preferably central field 24 above a central pole of either polarity but which for convenience, will be assumed to be positive and which I have so marked.

The field is extended into a pole 25 in proximity to the glass 16 and is preferably reduced in size as it approaches this glass, gaining in intensity of flux and giving more room for examination of the dial. For any given construction this would have to be designed to carry the requisite magnetic flux with as little interruption to the view as possible, obtaining greater intensity of magnetic flux at 25 at the same time that the view is cleared, and losing in possible leakage only. I make the other pole of my electro-magnet in the form of a ring 18 connecting it with the field 24 by means of yoke 26 which I aperture at any desired number of places, here made four, as at 27.

In order to improve the magnetic conditions and to avoid any possibility of the aperturing to give full view resulting in angular pull upon the needle through irregular distribution of magnetic flux in the ring 18 I extend the ends of my needle circularly at 28 and 29 to any desired degree, balancing magnetic conditions thereby. Evidently for many required uses the amount of aperturing and corresponding disturbance of uniformity of distribution can be adjusted to the extension of the needle circumferentially, extending 28 and 29 to any desired extent, if necessary into union, as in Fig. 8. In order to assist in the reading of the needle against the scale when the marker 30 lies back of a portion of the yoke 26, I form inwardly projecting points 31 at any suitable distances upon opposite sides of the marker or index 30. I provide current for the electro-magnet from any suitable source such as batteries diagrammatically indicated at 32.

I secure the cable, (preferably carrying the wires 21 in its interior) within a stem 33, integral with the electro-magnet, and longitudinally bore the stem at 33' to a sufficient depth to give room for a laterally extending threaded opening 34, opening 34' in line therewith and screw 35 by means of which the opening 33' is rendered tortuous and the cable is firmly secured Other securing means will suggest themselves to mechanics familiar with this art. The wires 21 pass to the winding of the electro-magnet through any suitably located hole or holes 36. In order that there may be no improper strain upon the spindle I prefer to make it of brass or of other non-magnetic material.

In the form shown in Fig. 7 I have additionally loaded the needle 11' by weighting the portions 12', 28' and 29' to increase the effect of the magnet thereon. This may not be desirable in all cases, particularly as the greatest concentration of magnetic flux appears at the center with consequent and advantageous greatest pull at the center of the needle. This central pull has no tendency to rotate the needle. In this first described form of my invention I purpose keeping the electric current on from the time when the sounder has reached the desired position, as determined by the difference in weight or drag upon the line or in any other existing or selected manner, until the sounder has been removed from the water and the reading of the needle has been taken. The current is most desirably introduced therefore through the extreme end of the cable opposite to that from which the sounder is suspended. Since the current can readily be so maintained and the precise method of doing this does not form a part of this invention I have not illustrated this structure other than diagrammatically. The needle 11 can be reset readily after the reading has been taken and the current has been cut off from its electro-magnet, by the use of any independent magnet by which the needle is attracted and so turned until it has reached the resetting position which can be suitably indicated or which can be determined by the zero point when any water which may have been trapped in the gage has been released. The needle is also accessible through removal of the magnet and glass. Before release of trapped water the needle can be dropped to place and its reading checked with that first taken.

In the form shown in Fig. 9 I have illustrated corresponding casing members, dial, glass and gage, but the connection 26' between the bail and the sounder is not used as an electro-magnet and its lower annulus 18' is preferably integral with the threaded collar 6'. In this form I have provided a little more room between the gage and the glass and within the space so provided have interrupted or separated the portions of the spindle 7' itself so that the upper portion 37 is frictionally united at 38 with the lower portion while this part 37 is supported preferably by two bearings 39 and 40 in order that a band brake 41 may act between them without unbalancing strains. I have attached the ends 42 and 43 of this band brake to a spring 44 which is united to the casing in any suitable manner as at 45 and whose end 46 is normally engaged by latch 47 to release the brake. The latch 47 is controlled by an electro-magnet 48 so that it may be withdrawn by a momentary impulse through wires 49, carried by the suspending cable, with the result that momentary application of the electric current sets the needle 50 rigidly in the position then assumed, independently of possible subsequent movement of the spindle 7'.

In the form shown in Figs. 9, 10 and 11, the resetting of the spring and needle are accomplished through an opening closed by a screw 51 which can be removed to make the interior accessible. The opening closed by 51 as well as the openings through which wires 49 pass can be sealed in any well known way, and these wires may be braced or supported in any convenient manner as by clamp 52.

Having thus described my invention what I regard as new and desire to secure by Letters Patent is:

1. In a deep sea sounder, a spindle, a needle engaging the spindle at one position thereon to rotate therewith and free from rotative engagement therewith at another position, means for causing the rotation of the spindle to correspond to the depths of the sounder, a dial indicating the angular position of the needle, a water-tight casing surrounding the needle and an electro-magnet and connections outside of said casing for shifting the position of the needle upon the spindle.

2. In a deep sea sounder, a spindle, a needle movable thereon to engage and disengage operatively for angular movement therewith, a dial for said needle, means for moving the spindle in agreement with the depth of the sounder, a water-tight casing surrounding the needle, and electric means outside of the casing for shifting the position of the needle upon the spindle.

3. In a deep sea sounder, a spindle, a needle normally movable therewith, a casing surrounding the needle and spindle, sealing them against admission of water and provided with a transparent face and scale markings in proximity to the said face, hydrostatic means for moving the spindle in proportion to the depth at which the spindle is located and means external to said casing for maintaining the needle in any angular position.

4. In a deep sea sounder, a spindle, a needle normally movable angularly therewith, a support having scale markings for indication of the position of the needle, hydrostatic means in proximity to the spindle for turning the spindle in proportion to the depth of water reached by it and an electro-magnet for setting the needle angularly in any position to which it has been turned by the spindle.

5. In a deep sea sounder, a hydrostatic gage, an axially movable needle operatively connected therewith, a casing for said needle closed against water admission and electro-magnetic means external to the casing for moving the needle axially.

6. In a deep sea sounder, a gage, a movable needle controlled thereby, a dial therefor and an electro-magnet having poles affecting the approximate center and extremities of the needle at the same time.

7. In a deep sea sounder, a gage, a needle movable thereby, a casing preventing admission of water to said needle and having a transparent face, and an electro-magnet outside of said casing and substantially inclosing the outside of said face.

8. In a deep sea sounder, a horizontal dial, a gage, a vertically extending support partly obscuring the view of the dial, and a needle adapted to be moved by the gage about the dial having a main indication marking and auxiliary indication markings thereon upon opposite sides laterally from the main indication marking thereon.

9. In a deep sea sounder, a casing, a needle therein, a hydrostatic gage for moving said needle and an annular electro-magnet for attracting said needle and holding it fixed in position.

10. In a deep sea sounder, a gage, a needle thereon, and an electro-magnet for affecting the needle and having a central pole substantially surrounded by a pole of opposite polarity.

11. In a deep sea sounder, a gage, a needle thereon, and a combined support for the needle sounder and electro-magnet for the needle.

12. In a deep sea sounder, a gage, a needle thereon, a belled magnet for moving the needle having a circumferential pole and an interior pole, and a winding for the magnet lying within the bell.

13. In a device of the character described, a gage, a needle thereon, an electro-magnet giving magnetic flux of variant densities in different parts of the path of the needle and lateral extensions of the needle to compensate for the variant field.

14. In a device of the character described, a gage, a needle thereon, means for creating a magnetic field variant in different parts of the needle and lateral extensions of the needle providing compensation for the variant field and having auxiliary indications for the needle.

15. In a device of the character stated, a gage having a spindle of non-circular section in a portion of its length, a needle normally engaging said non-circular portion of the spindle, a dial for the needle and an electro-magnet operative to withdraw the needle from said engagement.

16. In a deep sea sounder, a hydrostatic gage, an annular electro-magnet and an annularly extended needle angularly moved by said gage and forming an armature for said electro-magnet.

17. In a device of the character stated, a casing, a gage a needle, a dial glass and an electro-magnet mechanically retaining the dial glass in operative relation to the casing and needle.

18. In a deep sea sounder, a pressure gage, a needle moved thereby, a magnet winding and a magnet affecting said needle and substantially inclosing the winding.

THOMAS M. EYNON.

Witnesses:
WILLIAM STEELL JACKSON,
WM. HARRISON SMITH